Feb. 12, 1963

A. M. ESHAYA 3,077,505

HIGH TEMPERATURE THERMOCOUPLE

Filed Nov. 17, 1960

*INVENTOR.*
ALLEN M. ESHAYA

BY

INVENTOR.
ALLEN M. ESHAYA

United States Patent Office 3,077,505
Patented Feb. 12, 1963

3,077,505
HIGH TEMPERATURE THERMOCOUPLE
Allen M. Eshaya, Bellport, N.Y., assignor to the United
States of America as represented by the United States
Atomic Energy Commission
Filed Nov. 17, 1960, Ser. No. 70,084
10 Claims. (Cl. 136—4)

This invention relates to the measurement of high temperatures and more particularly to thermocouples for the measurement of high temperatures.

It has often been necessary to measure high temperatures in apparatuses, such as jet engines and rockets, where it has often been necessary or advantageous to determine the temperatures at which structural members fail under operating conditions or to operate the apparatuses for at least short periods of time at temperatures at which materials in the apparatuses normally have begun to fail. Also, the measurement of high temperatures in inert or reducing atmospheres has been extremely important in many industrial and research apparatuses. In various nuclear and chemical reactors having inert or reducing reactant gas streams, for example, it has been necessary to maintain the reactants temperature below a critical value in order to prevent the failure of the reactant containers and lines because such failures have required expensive repair and replacement of reactor components and have resulted in expensive shut downs. Also, it has been important to prevent such failures because they have created danger to personnel from explosions and leakage of toxic materials. As an illustration, in gas cooled nuclear reactors explosion and leakage have been dangerous because the reactors have had reducing gas streams at temperatures of up to 4000° F. or above where it has been difficult to provide containers with adequate strength vs. temperature characteristics and because the leakage of radioactive materials has been expensive to detect and difficult to clean up.

One of the most widely used temperature measuring devices has been the thermocouple. Such devices have been advantageous because they have been relatively simple and trouble free at moderate temperatures, and remotely operable so as to provide direct and precise temperature measurements in inaccessible locations and locations where it has been dangerous for personnel to approach too closely. Ordinarily, high temperature thermocouples have comprised two dissimilar metallic elements having first separated cold ends forming cold junctions and second contacting ends welded together to form hot junctions for exposure to the temperature to be measured. Electromotive forces have been produced in the cold junctions corresponding to the temperature of the hot junctions and this electromotive force or E.M.F. has been measured by a conventional electrical device such as a Wheatstone bridge having its leads connected with the cold junctions through a galvanometer.

One high temperature thermocouple that has been used in various of the above-mentioned apparatuses has been the Chromel Alumel thermocouple but this device has not been satisfactory for measuring temperatures above 2500 degrees Fahrenheit. Another high temperature thermocouple has been the tungsten molybdenum thermocouple but it has not been useful at temperatures above about 2900 degrees Fahrenheit. The highest temperature thermocouple that has been useful in the mentioned apparatuses has been the platinum-rhodium thermocouple but the usefulness of this device has been limited to temperatures below 3000 degrees Fahrenheit. The mentioned thermocouples and all others known heretofore have had short life at high temperatures due to the low melting points of their elements or they have been inherently relatively unstable even at temperatures up to 3000 degrees Fahrenheit such that frequent recalibration has been necessary. The thermocouples have been unstable because temperatures up to 3000 degrees Fahrenheit have caused the thermocouple elements to diffuse into each other and to become heterogenous. For example, volatilization of rhodium and diffusion thereof into platinum has created undesirable instabilities and temperatures above 3000 degrees Fahrenheit have increased this problem. Instabilities have also always been present in reducing atmospheres such as have been present in gas cooled nuclear reactors and jet engines where the thermocouples have been contaminated by the formation of carbides therein and the diffusion of the carbides into one or both of the thermocouple elements has created undesirable instabilities. Moreover, the thermocouples known heretofore have required a time consuming welding operation to join their hot junctions and the hot junctions could not easily be separated. Also, high temperature thermocouples known heretofore have comprised two relatively soft metallic elements that have not provided sufficient self-support in high velocity gas streams so that the thermocouples have been shorted or bent.

An attempt has been made to decrease the problem of diffusion and contamination by prolonged heating and fluxing of the contaminated thermocouples with borax but this method has only partially restored the thermocouples and the only sure way to eliminate the contamination has been to throw away the contaminated portion of the thermocouple. Also, attempts have been made to use unconventional thermocouple materials for the thermocouple elements but these attempts have increased the problems of diffusion at high temperatures or have provided insufficient E.M.F. above 5 microvolts for conventional measuring devices to be operable therewith. Additionally, attempts have been made to shield the thermocouples from reducing atmospheres but these shields have not been able to withstand high enough temperatures, have decreased the sensitivity of the thermocouples, have been difficult to make, and have been subject to leakage or have caused diffusion of impurities from the shield or the insulation used therewith into the thermocouple elements.

In accordance with this invention a thermocouple is provided that contemplates substantially impurity free metallic and non-metallic elements and has the advantages that the elements have high melting points, do not diffuse at high temperatures, do not form carbides in a reducing atmosphere at high temperatures, avoid the necessity of time consuming welding at their hot junctions, are self-supportable without insulation or sheathing in a high velocity gas stream, and produce sufficient E.M.F. to provide an accurate measuring device for high temperatures. More particularly, this invention provides a simple, stable, relatively maintenance free thermocouple for measuring high temperatures in an inert or reducing atmosphere comprising a longitudinally extending substantially pure rhenium member having a cold first free end and a second opposite end, and a parallel longitudinally extending substantially pure graphite member having a cold first free end and a second end having means for holding said second ends in frictional compressed contact.

The above and further novel features of this invention will appear more fully from the following detailed description when the same is read in connection with the accompanying drawings. It is to be expressly understood, however, that the drawings are not intended as a definition of the invention but are for the purpose of illustration only.

Figure 1:
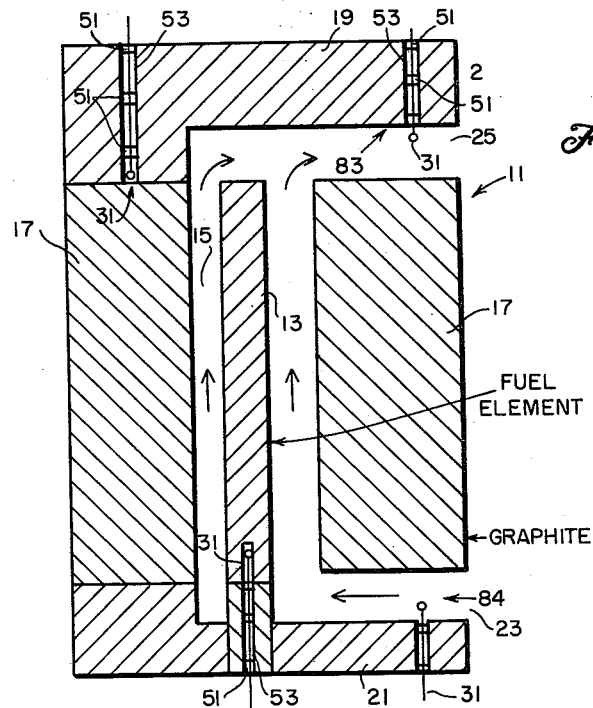
FIG. 1 is a partial cross-section of the thermocouple of this invention in an apparatus with which the thermocouple is advantageously useful.
Figure 3:
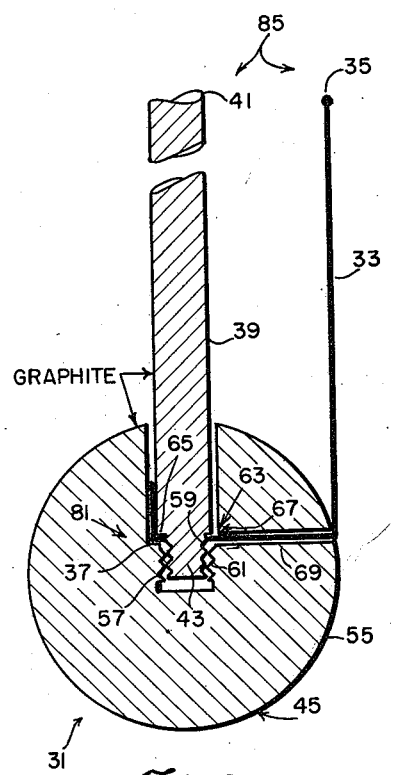
FIG. 3 is a partial cross-section of the thermocouple of FIG. 2.

Referring now to FIG. 1, gas cooled reactor 11 has a conventional fuel element such as a nuclear fuel element 13 having a suitable pipe support surrounded by a passageway 15 formed in a graphite body 17 for the flow of a cooling gas from a suitable source (not shown). Top 19 and bottom 21 are advantageously metal and form a portion of the supporting means and containing means for the reactor components. Cool gas enters the bottom of the reactor at inlet 23 and leaves the reactor at outlet 25. Thereupon, the gas is cleaned in a suitable cleaner (not shown), heat is taken therefrom to produce power in conventional power generator (not shown) and the cooled gas is recirculated into the reactor at 23.

In gas cooled reactors, the fuel elements operate at temperatures up to over 4000 degrees Fahrenheit and it is advantageous to determine the temperature thereof in order to prevent melting or other damage thereto. It is also advantageous to determine the gas temperature at outlet 25 which is advantageously close to the fuel element temperature and the interface temperature between two dissimilar components such as graphite member 17 and top 19, which is also at a high temperature, whereby the heat transfer properties thereof can be studied. Thermocouples are advantageous for measuring temperatures at the mentioned locations because the high temperatures involved can be accurately measured at remote locations therefrom. The thermocouples known heretofore, however, have been unsatisfactory for measuring high enough temperatures and the high temperatures in the reducing atmospheres involved in a gas cooled nuclear reactor. As an illustration, the high temperature thermocouples known heretofore have been subject to instabilities caused by the formation of carbides therewith from the reducing atmosphere present and the carbides have diffused into the thermocouple elements to produce undesirable instabilities. An attempt has been made to shield the thermocouples from the reducing atmosphere but these shields have not been able to withstand high enough temperatures, have decreased the sensitivity of the thermocouples, have been expensive, and have been subject to leakage or caused diffusion of impurities from the shield into the thermocouple elements.

Figure 2:
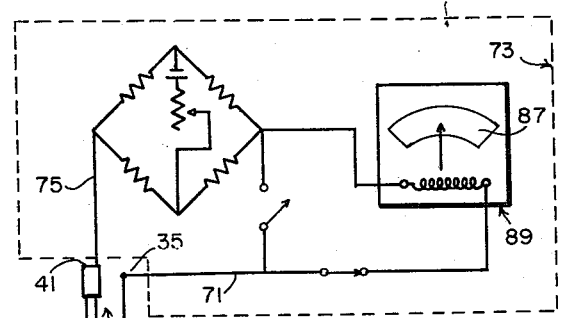
FIG. 2 is a partial isometric and schematic drawing of the thermocouple of FIG. 1 and an indicating means therefor.
Figure 2:
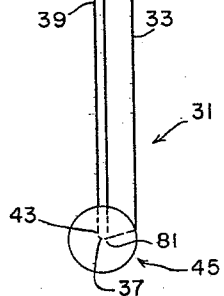

Referring now to FIG. 2, the apparatus of this invention contemplates an unshielded graphite rhenium thermocouple 31 that is unexpectedly stable at high temperatures in a reducing gas stream, simple to fabricate, relatively maintenance free, durable, and easy repeatedly to assemble and disassemble. To this end, thermocouple 31 comprises a longitudinally extending rhenium wire 33 having a cold first free end 35 and a second end 37, and a parallel longitudinally extending substantially pure graphite rod 39 having a cold first free end 41 and a second end 43 having means 45 for holding said second ends in frictional compressed contact with each other.

Rhenium wire 33 is metallic, has a melting point of 3167±50° C., does not readily form carbides, is relatively soft and easy to work and substantially retains its properties stably even after repeated exposure to high and low temperatures in a reducing or inert atmosphere. Standard 99.9% pure rhenium wire therefor is readily commercially available at reasonable cost in standard cold drawn annealed wire dimensions, for example, .020" diameter, rhenium wire sold under the trademark "Varacloid" by the Varlacoid Chemical Company of New York.

Graphite rod 39 is non-metallic, has a melting point of 3652—97° C. is relatively strong for supporting rhenium wire 33 in a high velocity gas stream, is easy to machine and substantially retains its properties stably even after repeated exposure to high and low temperatures in a reducing or inert atmosphere. Standard graphite therefor is readily commercially available at low cost in almost any size or dimension. One advantageous grade is the AA reactor grade sold under the trademark "National" by the National Carbon Company. Any impurities in the graphite have been driven out by exposing the graphite to high temperatures below its melting point, e.g., 1600° C. and this makes the graphite substantially pure and stable.

The rod 39 is thick enough to support the rhenium wire 33 in the location where the temperatures are to be measured. For example, the rod may be about ¼" thick and 12" long but thinner or thicker dimensions are possible and the rod may be longer or shorter. Standard ceramic insulation 51 separates the wire 33 from the rod 39 and closes the well 53 containing the thermocouple 31.

Advantageously, means 45 on rod 39 for holding the end 37 of wire 33 in frictional compressed contact with end 43 of rod 39 comprises a cooperating interconnecting cap 55 having internal threads 57 that mate with threads 59 on the end 43 of rod 39, to form an interface 61 between the rod 39 and cap 55, a shoulder 63 adjacent shoulder 65 of rod 39 forming an interface 67 between rod 39 and cap 55 and a hole 69. Wire 33 fits tightly in hole 69 and is interposed between rod 39 and cap 55 at interfaces 61 and 67, thus to form a good contact between rod 39 and wire 33 that has substantially no resistance drop.

End 35 of wire 33 connects with lead 71 of standard bridge 73 and end 41 of rod 39 connects with the other lead 75 of bridge 73. Advantageously bridge 73 is a standard Wheatstone bridge circuit so as to convert E.M.F. in ends 35 and 41 to the temperature of ends 37 and 43 of the wire 33 and rod 39.

In operation, the hot junction end 81 of thermocouple 31 is exposed to a high temperature, such as is shown in FIG. 1, where several like thermocouples 31 are exposed respectively in reactor 11 to high velocity reducing hot gas at location 83, high velocity reducing cold gas at location 84, high reducing gas temperature in fuel element 13, and high reducing or inert gas temperatures at the interface of the two different members 17 and 19. The cold junctions 85 of the thermocouples are at some standard low temperature below the temperature of the hot junction 81, e.g., 72 degrees Fahrenheit, and an electromotive force is produced in the cold junctions 85 corresponding to the temperature of the hot junctions which is converted into an E.M.F. reading and a temperature indication by dial 87 of galvanometer 89 which is connected in Wheatstone bridge 73.

Figure 4:
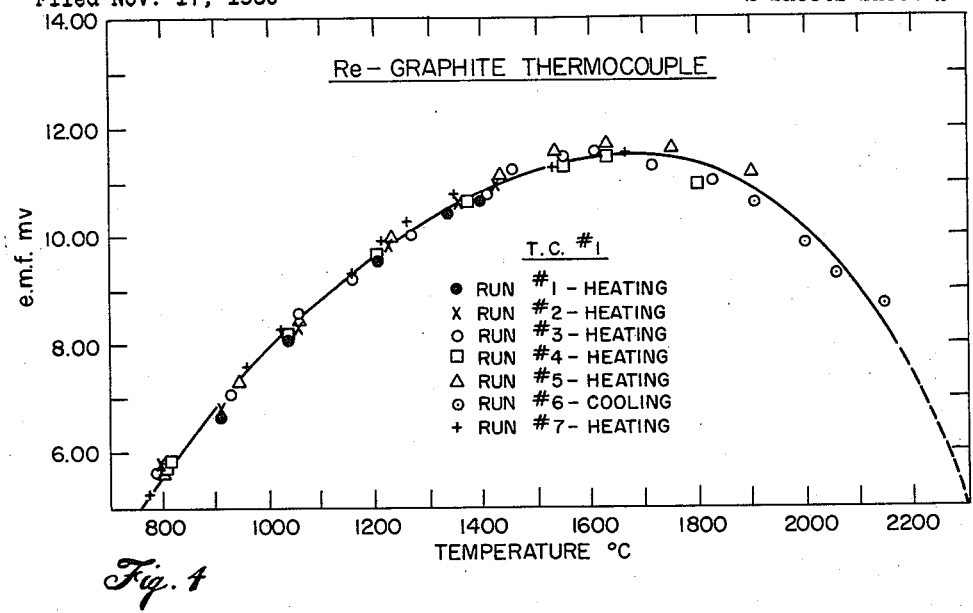
FIG. 4 is a graph of the operation of a thermocouple like the one shown in FIG. 3.
Figure 5:
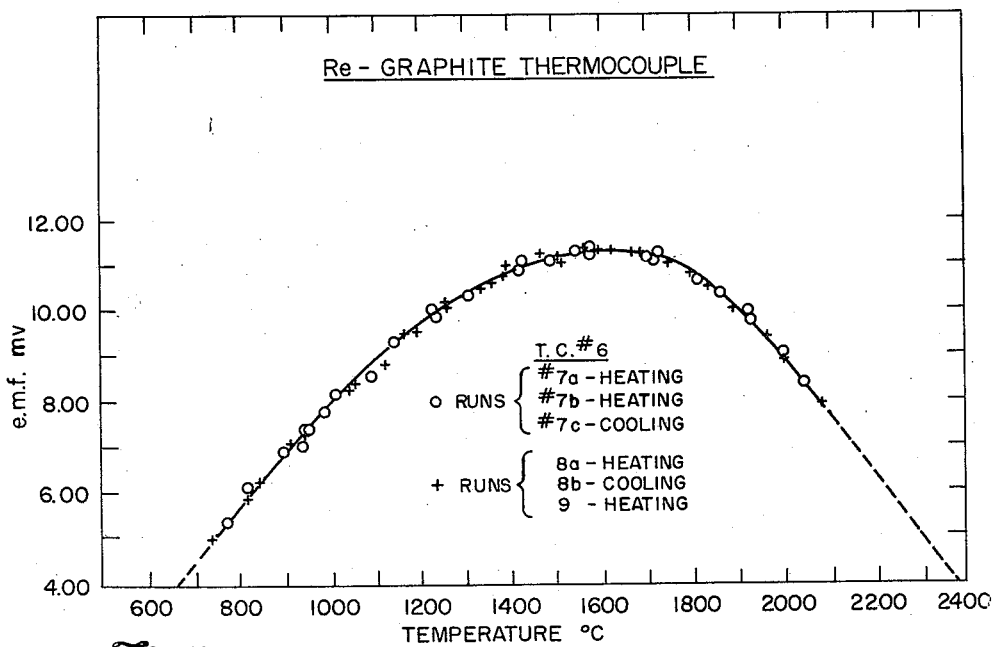
FIG. 5 is a graph of the operation of another thermocouple like the one shown in FIG. 3.

As shown by the graphs in FIGS. 4 and 5, thermocouples like those described above have produced measurable E.M.F. at very high temperatures. As is shown, the E.M.F. produced by the thermocouple increases when the hot junction temperature increases from about 765–1550° C. and the E.M.F. decreases when the hot junction temperature is above 1800° C. up to a projected 5 milivolt E.M.F. at about 2400° C. Conventional practice is followed up to about 1550° C., i.e., the E.M.F. increases as the hot junction temperature increases. Above 1800° C. it is easy to tell whether the temperature of the hot junction is increasing or decreasing either with optical pyrometry if convenient, or if not convenient, by determining whether cooperating thermocouples below 1550° C. indicate a rise in temperature or a decrease in temperature. As an illustration, if the thermocouple in the cold gas in and the hot gas out in reactor 11 are at 1500° C. the thermocouple in the fluid element is above 1500° C. If the E.M.F. produced by the latter or fuel element thermocouple decreases and the E.M.F. produced by the former gas in and gas out thermocouples keeps on increasing, it is obvious that the fuel element thermocouple is increasing in temperature and is at a temperature corresponding to the E.M.F. shown on the right descending portion of the temperature vs. E.M.F. graph for the fuel element thermocouple, which graph is like the graphs shown in FIGS. 4 and 5.

As will be understood from the above, the described gas-cooled nuclear reactor 11 is conventional and has an inside reducing or inert atmosphere provided, for example, by the presence of a reducing or inert cooling gas therein, such as $CO_2$ and CO or helium.

It will also be understood that the thermocouple of this invention is not limited to use in a gas cooled nuclear reactor but it also has numerous other applications for measuring high temperatures where a reducing atmosphere is present, such as in a jet engine exhaust, or where an inert atmosphere is present such as in high temperature research apparatus.

This invention provides means for measuring high temperatures in a gas cooled reactor and other devices that were not possible with thermocouples known heretofore. Moreover, tests have shown that the thermocouple of this invention is simple, stable, durable, easy to assemble and disassemble, and can be exposed to hot reducing or inert high velocity gas streams and to temperatures from 765 to 1550° C. and well above 1800° C. without sheathing, without damage, and substantially without diffusion of one thermocouple element into the other.

I claim:

1. A thermocouple for measuring high temperatures, comprising a longitudinally extending exposed graphite member having a first free end and a second end, and a longitudinally extending exposed rhenium member having a first free end and a second end in contact with the second end of said graphite member whereby an electromotive force is produced in said first free ends of said members that corresponds with the temperature of said second ends of said members where they are in contact with each other when said second ends of said members are at high temperatures.

2. A thermocouple for measuring high temperatures, comprising a longitudinally extending substantially pure exposed graphite member having a first free end that is cold and a second exposed end, and a longitudinally extending substantially pure rhenium member having a first free end that is cold and a second exposed end in contact with the second end of said graphite member whereby an electromotive force is produced in said first free ends of said members even when said second contacting ends of said members are exposed to high temperatures and said electromotive force corresponds to the temperature of said second contacting ends of said members.

3. A thermocouple for measuring high temperatures, comprising a longitudinally extending exposed substantially pure rhenium member having a cold first free end and a second end, and a longitudinally extending exposed substantially pure graphite member having a cold first free end and a second opposite end having means operable with said second end of said rhenium member to hold said second ends in frictional compressed contact with the second end of said graphite member hereby a measurable electromotive force corresponding to the temperature of said second contacting ends of said members is produced in said first free ends of said members even when said second contacting ends of said members are exposed to high temperatures.

4. A thermocouple for measuring high temperatures, comprising a longitudinally extending substantially pure exposed rhenium wire having a cold first free end and a second exposed end, and a longitudinally extending substantially pure exposed graphite rod having a first free end and a second end having exposed means that holds said second end of said rhenium wire in exposed contact therewith by interfitting frictional surface cooperation whereby a measurable electromotive force corresponding to the temperature of said second contacting ends of said members is produced in said first free ends of said members even when said second contacting ends of said members are exposed to high temperatures.

5. A thermocouple for measuring high temperatures, comprising a longitudinally extending substantially pure exposed graphite rod having a cold first free end and a second opposite threaded end, a substantially pure exposed graphite member having threads that mate with the threads of said graphite rod to selectively form a frictional mating interface, and a longitudinally extending substantially pure rhenium wire having a cold first free end and a second end interposed between said frictional mating interface so as to be in frictional contact with the second end of said graphite rod whereby an electromotive force corresponding to the temperature of said second contacting ends of said rod and wire is produced in said first free ends of said rod and wire even when said second contacting ends of said members are exposed to high temperatures in a reducing atmosphere.

6. Apparatus for measuring high temperatures, comprising a longitudinally extending substantially pure graphite rod having a cold first free end and a second opposite threaded end, a substantially pure graphite member having threads that mate with the threads of said graphite rod to selectively form a frictional mating interface, a longitudinally extending substantially pure rhenium wire having a cold first free end and second end interposed between said frictional mating interface so as to be in frictional contact with the second end of said graphite rod whereby an electromotive force corresponding to the temperature of said second contacting ends of said rod and wire is produced between said first free ends of said rod and wire when said second contacting ends thereof are exposed to high tempeartures, and means connected between said first free ends of said members for determining and correlating the electromotive force produced between said first ends of said rod and wire with the temperature of said second ends.

7. Apparatus for measuring high temperatures from about 765° to about 1550° centigrade and over about 1800° centigrade, comprising a first exposed, alloy-free, coreless limb of substantially impurity free rhenium, a second exposed, alloy free, coreless limb of substantially impurity free graphite, and removable non-seizing means corresponding with said second limb for holding said limbs in exposed contact to form a sensitive thermocouple with individual selectively separable parts, said elements producing an increasing E.M.F. from about 765° to 1550° centigrade at said contact and a decreasing E.M.F. above about 1800° centigrade at said contact.

8. Apparatus for measuring high temperatures, comprising a first, alloy free, coreless, exposed limb of substantially impurity free rhenium, a second, alloy free, coreless, exposed limb of substantially impurity free graphite having a large cross sectional area, and a nonseizing graphite cap that mates with said second limb to hold said first and second limbs in removable exposed electrical contact at one end and in spaced relation except at said contact whereby said limbs can be stably supported to produce an electromotive force corresponding with the temperature at said contact.

9. Apparatus for measuring high temperatures, comprising an exposed first self-supporting, longitudinally extending coreless limb of substantially high purity graphite having a threaded end and a removable substantially high purity graphite cap that mates with said threaded end, and a substantially high purity exposed rhenium second coreless limb having an end portion in operable association with said cap and first limb to form a thermocouple having an exposed high temperature junction which can be supported by said first limb even without an external sheathing for support and which is free from seizing so as to be selectively severable at said threads.

10. Apparatus for measuring high temperatures, comprising an exposed, coreless, first self-supporting, longitudinally extending limb of substantially high purity graphite having a thick cross section, a threaded end and a spherical substantially high purity graphite cap forming internal threads that frictionally mate with said threaded end, and a coreless, substantially high purity, exposed rhenium second limb having a relatively thin cross section and an end portion interposed between said cap and first limb that passes through said cap substantially at right angles to said first limb thereby to provide a stable, exposed, contact between said first limb and said cap and to space said limbs except at said end portion of said second limb, said first limb permitting coreless support of said limbs and removal of individual of said elements without seizing at said threaded end of said first limb, and said limbs being adapted to produce an increasing E.M.F. from about 765° to 1550° centigrade at said contact and a decreasing E.M.F. above 1800° centigrade at said contact.

References Cited in the file of this patent

UNITED STATES PATENTS

| | | |
|---|---|---|
| 1,339,505 | Fahrenwald | May 11, 1920 |
| 1,823,706 | Stoehle | Sept. 15, 1931 |
| 2,015,838 | Borden et al. | Oct. 1, 1935 |
| 2,560,829 | Stewart | July 17, 1951 |
| 2,802,894 | Schneider et al. | Aug. 13, 1957 |
| 2,881,236 | Evraets | Apr. 7, 1959 |
| 2,948,766 | Schneider et al. | Aug. 9, 1960 |
| 2,957,037 | Sims | Oct. 18, 1960 |

FOREIGN PATENTS

| | | |
|---|---|---|
| 822,916 | Great Britain | Nov. 4, 1959 |